No. 749,594. Patented January 12, 1904.

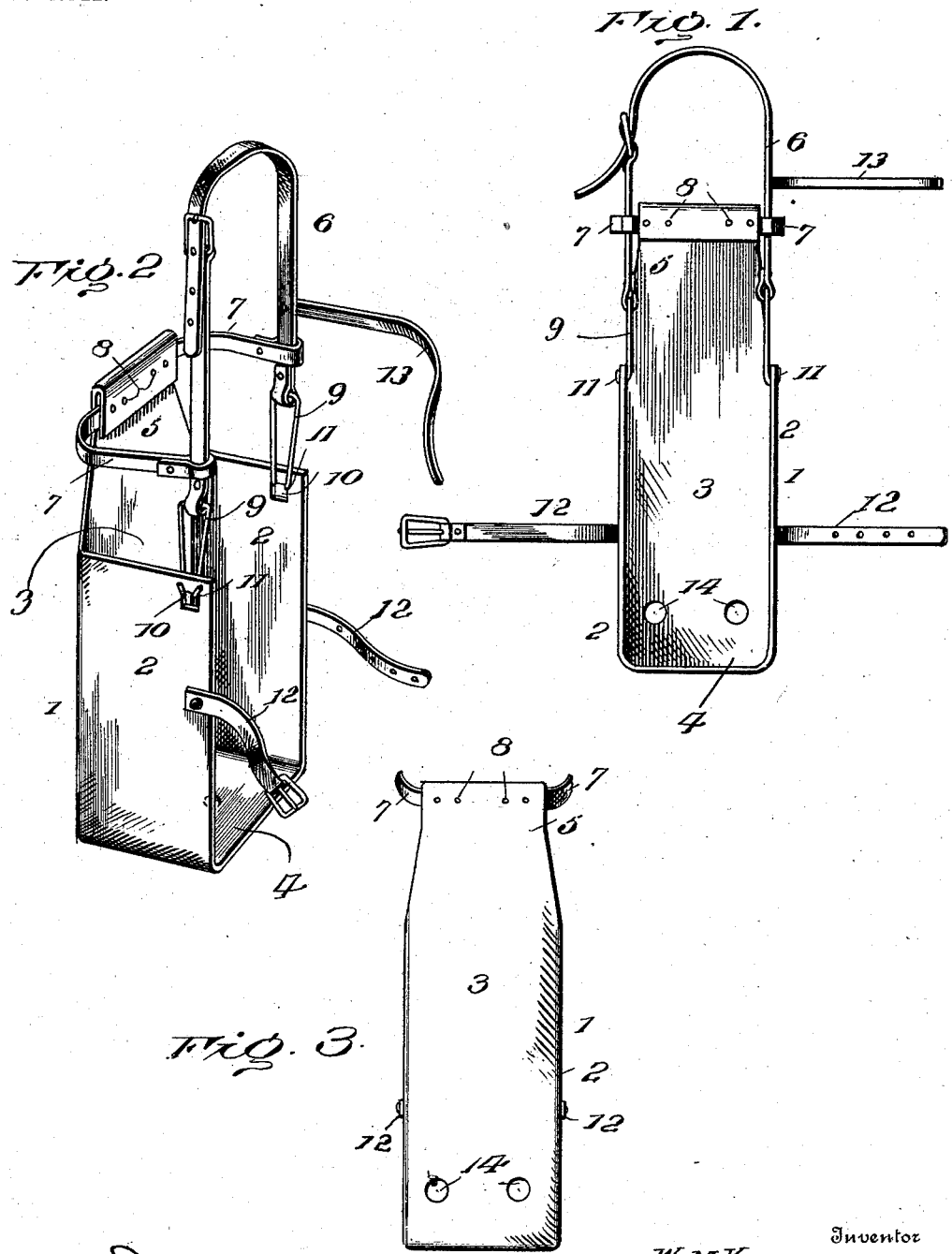

UNITED STATES PATENT OFFICE.

WILLIAM M. VANCUREN, OF FOYIL, INDIAN TERRITORY.

MUZZLE FOR CALVES OR COLTS.

SPECIFICATION forming part of Letters Patent No. 749,594, dated January 12, 1904.

Application filed July 27, 1903. Serial No. 167,224. (No model.)

*To all whom it may concern:*

Be it known that I, WILLIAM M. VANCUREN, a citizen of the United States, residing at Foyil, in the Cherokee Nation, Indian Territory, have invented new and useful Improvements in Muzzles for Calves or Colts to Keep Them from Sucking, of which the following is a specification.

This invention relates to improvements in muzzles or like weaner devices for calves and colts.

The object of the invention is to provide an extremely simple device of this character adapted to close over the mouth of the animal upon upward movement of the head and attached in such a manner as to permit grazing when the head is lowered for this purpose.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a rear elevation of the invention. Fig. 2 is a perspective view. Fig. 3 is a broken view showing the manner of attaching the ear-straps to the front extension of the muzzle-body.

Corresponding and like parts are referred to in the following description and indicated in all the views of the drawings by the same reference characters.

The device consists of the scoop-shaped body 1, comprising the sides 2, front 3, and bottom or muzzle portion 4. The body 1 is preferably stamped from sheet metal, though same may be made of leather or analogous material. The front 3 of the body 1 is provided with an extension 5, which is formed in cutting the body from the blank from which it is formed. The attachment whereby the muzzle is secured to the head of the animal consists of the head-strap 6, which is prevented from backward slipping movement by means of ear-straps 7, which connect the lower portions of the head-strap to the extension 5 of the front of the muzzle-body. The ear-straps are secured to the extension 5 by means of bending the upper extremity of the said extension upon itself, the strap being received between the bent portion and the body of the extension and secured in such position by means of fastenings 8, such as rivets or the like. The head-strap 6 is not directly connected to the body 1, the lower ends of the said strap being looped about U-shaped members 9, said members having their lower ends secured to the sides 2 of the body 1 of the muzzle, said ends being passed through openings 10 and bent, as shown at 11, to secure the members to the sides 2. The head-strap not being directly connected to the muzzle-body is not liable to be cut when secured to the body, as above described. Extending rearwardly from the sides 2 of the body 1 are straps 12, which pass beneath the jaws of the animal and which are so connected as to permit a certain amount of movement of the body, so that the animal may freely graze when the head is lowered to the ground. A throat-strap 13 is secured to the head-strap 6 and passing about the throat of the animal firmly secures the muzzle in position, coöperating with the straps 12 and 7. Air-openings 14 are provided in the front 3 and base 4 of the body for obvious purposes. The head-strap 6 is of course adapted for adjustment to large and small animals.

Having thus described the invention, what is claimed as new is—

1. In a device of the class described, the combination with a body of approximately scoop form, an extension projected upwardly from the front of the body, a head-strap secured to the sides of the body, ear-straps connecting the head-strap and the extension of the front of the body, the said extension having its upper portion bent to inclose the ear-straps, and other securing-straps projected from the body.

2. In a device of the class described, the combination with a body, an extension projected upwardly from the front of the body and having its upper portion bent upon itself, attaching members secured to the sides of the body, a head-strap secured to the said attaching members, ear-straps connecting the head-strap and the front extension aforesaid, a portion of the ear-straps being received between the bent portion of the upper extension and secured in said position.

3. In a device of the class described, the combination with a muzzle-body of approximately scoop form, an extension projected upwardly from the front of the said body and having its upper portion bent upon itself, U-shaped members having their lower ends secured in openings in the sides of the body, a head-strap having its ends attached to the securing members aforesaid, ear-straps connecting the head-strap and the front extension of the body and received by the bent portion of the said extension, a throat-strap secured to the head-strap, and jaw-strap secured to the sides of the body.

WILLIAM M. VANCUREN.

Witnesses:
  JOHN H. GIBSON,
  RICHARD HOLLAND.